US008804166B2

(12) United States Patent
Morita

(10) Patent No.: US 8,804,166 B2
(45) Date of Patent: Aug. 12, 2014

(54) IMAGE PROCESSING APPARATUS AND METHOD FOR CONTROLLING IMAGE PROCESSING SYSTEM

(75) Inventor: Hiroyasu Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 12/421,334

(22) Filed: Apr. 9, 2009

(65) Prior Publication Data

US 2009/0284784 A1 Nov. 19, 2009

(30) Foreign Application Priority Data

May 13, 2008 (JP) .................................. 2008-126452

(51) Int. Cl.
*G06F 3/12* (2006.01)
(52) U.S. Cl.
USPC ......................................................... 358/1.15
(58) Field of Classification Search
CPC .......... H04N 1/00233; H04N 1/00007; H04N 1/00501; H04N 1/000503; H04N 1/000506; H04N 1/000509; H04N 1/000511; H04N 1/00061; H04N 1/00058; H04N 1/00223; H04N 1/00411; H04N 1/00413; H04N 1/00228
USPC ................................................ 358/1.15, 1.16
See application file for complete search history.

(56) References Cited

U.S. PATENT DOCUMENTS

| | | | | |
|---|---|---|---|---|
| 2003/0011805 | A1* | 1/2003 | Yacoub | 358/1.15 |
| 2005/0002063 | A1* | 1/2005 | Hanamoto | 358/1.18 |
| 2005/0223324 | A1 | 10/2005 | Tashiro | 715/273 |
| 2007/0070397 | A1* | 3/2007 | Shimoichi | 358/1.15 |
| 2007/0234400 | A1* | 10/2007 | Yanagi | 726/1 |
| 2008/0068642 | A1* | 3/2008 | Takahashi | 358/1.15 |
| 2008/0297830 | A1* | 12/2008 | Sewell et al. | 358/1.15 |

FOREIGN PATENT DOCUMENTS

| | | | | |
|---|---|---|---|---|
| CN | 1678010 A | 10/2005 | | |
| JP | 11-275299 A | 10/1999 | | |
| JP | 2000-255133 A | 9/2000 | | |
| JP | 2004-110848 | 4/2004 | | G06F 3/12 |
| JP | 3658180 | 6/2005 | | G06F 3/12 |

\* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

The present invention can provide an image processing system in which a job setting screen is displayed on a local apparatus in consideration of the capabilities of the local apparatus and a remote apparatus when a plurality of image processing apparatuses cooperatively execute a job. To accomplish this, in the present image processing system, the local apparatus acquires function information on the remote apparatus when the plurality of image processing apparatuses executes one job in cooperation. Furthermore, the local apparatus controls the display contents of a setting screen used when an operator sets a job setting in order to restrict a job function based on the acquired function information and function information on the local apparatus itself.

7 Claims, 11 Drawing Sheets

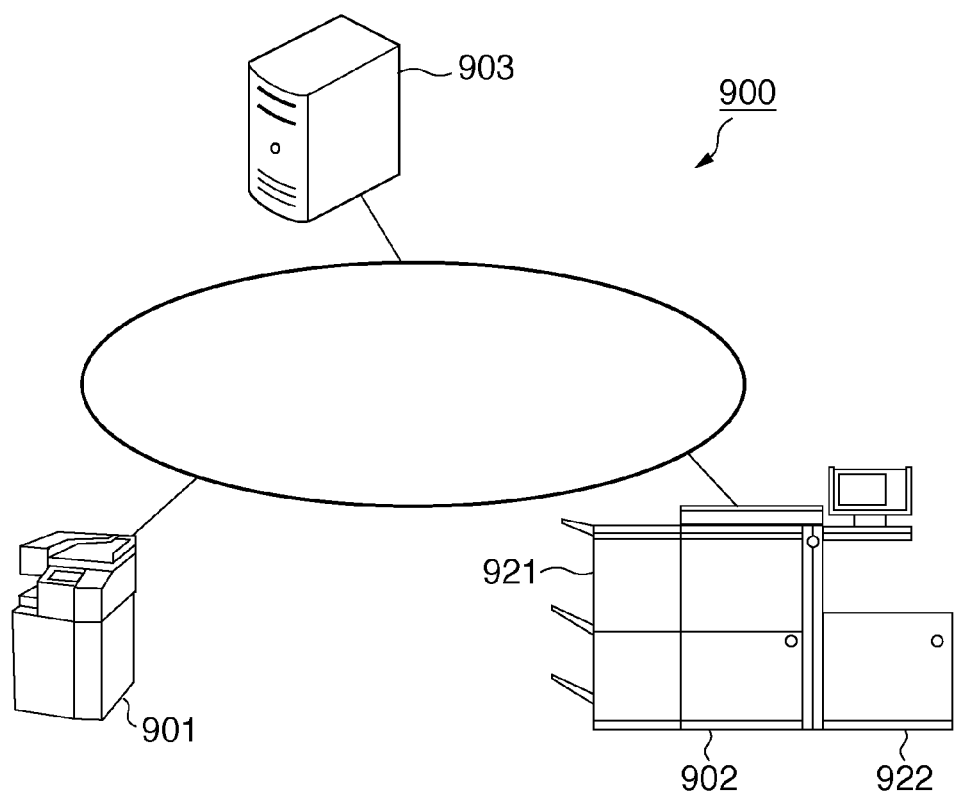
F I G. 9

IMAGE PROCESSING APPARATUS AND METHOD FOR CONTROLLING IMAGE PROCESSING SYSTEM

BACKGROUND OF THE INVENTION

1. Field of the Invention

The present invention relates to an image processing system that enables different apparatuses to perform image reading and output of the read image, and a method for controlling the same.

2. Description of the Related Art

Recently, with the development of digitization and networking, by using a plurality of image processing apparatuses connected to a network, an image read by an apparatus is transmitted to another apparatus, and printing of the image is performed. For example, there is a case in which an apparatus at hand is caused to read an original, and another apparatus that includes an accessory such as a finisher and has significant paper-handling capabilities is caused to perform printing, bookbinding, and the like.

At this time, a user sets settings regarding reading, printing, and the like using an operation unit of the apparatus at hand that will read the original. However, the apparatus at hand on the reading side (hereinafter, referred to as a local apparatus) and an apparatus on the output side (hereinafter, referred to as a remote apparatus) may have different capabilities or different accessory configurations. Consequently, if an operation screen provided by either apparatus is displayed as-is, there is a possibility that settings regarding job execution may not be sufficiently set, or an unnecessary setting screen may be displayed. Thus, it is necessary to provide the user with an appropriate operation screen on which the capabilities and configurations of the local apparatus and the remote apparatus are reflected.

Japanese Patent No. 3658180 discloses technology with which an operation-procedure-information-indicating script is acquired from the remote apparatus, and the local apparatus interprets the script and displays an operation screen. Furthermore, Japanese Patent Laid-Open No. 2004-110848 discloses technology with which the processing capabilities and the present state of the remote apparatus that cooperatively performs the processing of a job are recognized via a network, and an operation procedure largely similar to that performed in the remote apparatus can be realized using an operation panel of the local apparatus.

However, the aforementioned conventional technology has problems as described below. For example, with the conventional technology, when setting an output setting, the operation screen, on which the capabilities of the remote apparatus that cooperatively performs the processing of a job are reflected, is displayed on the local apparatus. However, with such conventional technology, the capabilities of the remote apparatus are merely acquired and displayed on the operation screen and, thus, the capabilities of the local apparatus are not taken into consideration.

Therefore, even if the local apparatus has a color scanning function, and the remote apparatus can only handle a monochrome image, a contradiction in which setting for color reading can be set occurs. In this case, the remote apparatus needs to convert an image that was read in color into a monochrome image, or it is necessary to prompt the user to set a monochrome setting again. Or, the user needs to set monochrome reading and the like disregarding the color reading setting. However, when the remote apparatus performs image conversion processing, the processing burden on the system will increase, and the job processing speed will decrease. In addition, if the user is prompted to reset a reading setting, or the user sets a setting disregarding the color reading setting, the burden on the user will increase or the user will become confused and, thus, such circumstances are not preferable in terms of operability.

SUMMARY OF THE INVENTION

The present invention enables realization of an image processing system in which a job setting screen is displayed on the local apparatus in consideration of the capabilities of the local apparatus and the remote apparatus when a plurality of image processing apparatuses cooperatively execute a job.

One aspect of the present invention provides an image processing apparatus capable of executing a job in cooperation with a plurality of image processing apparatuses connected via a network, the image processing apparatus comprising: an input unit that inputs image data; a first acquisition unit that acquires function information indicating a processing capability of a second image processing apparatus that is to be an output destination of the image data inputted by the input unit from the second image processing apparatus; a determination unit that determines whether or not function restriction needs to be imposed on a setting used when executing the job based on the acquired function information and function information on the image processing apparatus; a display control unit that restricts display contents of a setting screen regarding the job in accordance with the determination result by the determination unit, and to cause a display device provided to the image processing apparatus to perform display; a decision unit that decides a setting for the job in accordance with information inputted via the setting screen; and a transmission unit that transmits the decided setting for the job and the image data to the second image processing apparatus.

Another aspect of the present invention provides a method for controlling an image processing system in which a plurality of image processing apparatuses connected via a network can cooperatively execute a job and that comprises a first image processing apparatus for inputting image data and a second image processing apparatus for outputting an image in accordance with the inputted image data, the method comprising: acquiring function information indicating a processing capability of the second image processing apparatus from the second image processing apparatus; determining whether or not function restriction needs to be imposed on a setting used when executing the job based on the acquired function information and function information on the first image processing apparatus; controlling display so as to restrict display contents of a setting screen regarding the job in accordance with a determination result in the determination and cause a display device provided to the first image processing apparatus to perform display; deciding a setting for the job in accordance with information inputted via the setting screen; and transmitting the decided setting for the job and the image data from the first image processing apparatus to the second image processing apparatus.

Further features of the present invention will be apparent from the following description of exemplary embodiments with reference to the attached drawings.

BRIEF DESCRIPTION OF THE DRAWINGS

FIG. 9 is a diagram showing an image processing system 900 according to a third exemplary embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
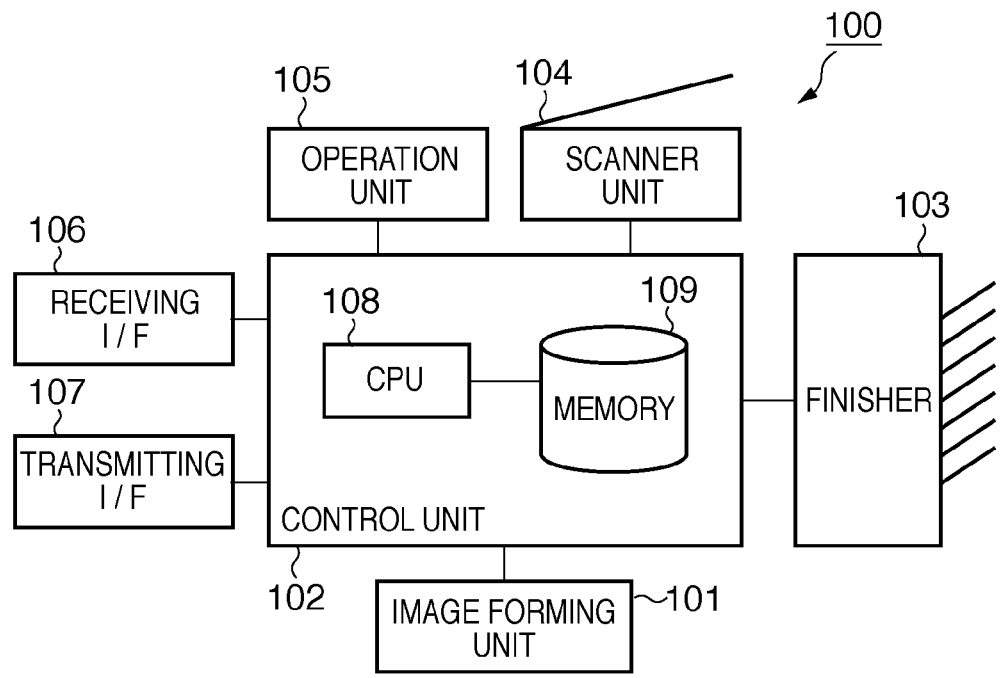
FIG. 1 is a block diagram showing a schematic configuration of an image processing apparatus 100 according to a first exemplary embodiment.

Hereinafter, a first exemplary embodiment will be described with reference to FIGS. 1 to 7. FIG. 1 is a block diagram showing a schematic configuration of an image processing apparatus 100 according to the first exemplary embodiment. Here, the main constituent elements of the image processing apparatus 100 will be described. Thus, the image processing apparatus according to the present invention may be configured to include another constituent element. The image processing apparatus may also be configured not to include some of the constituent elements.

Image Processing Apparatus

The image processing apparatus 100 includes an image forming unit 101, which forms an image on a recording material using a method such as an electrophotographic method, and a control unit 102, which performs overall control of the image processing apparatus 100. Further, the image processing apparatus 100 includes a finisher 103, a scanner unit 104, an operation unit 105, a receiving I/F 106, and a transmitting I/F 107.

The finisher 103 performs post-processing such as staple processing on a printed recording material. The scanner unit 104 reads an image from an original. The operation unit 105 is used by a user (operator) and is a device used for inputting various types of data and commands. Specifically, the operation unit 105 includes an input device and a display device. The receiving I/F 106 includes a plurality of interfaces for receiving scan data, fax data, and the like. The transmitting I/F 107 includes a plurality of interfaces for transmitting scan data, fax data, and the like. These blocks (101, 103 to 107) are respectively connected to the control unit 102 with their own dedicated interfaces.

The control unit 102 includes a central processing unit (CPU) 108 and a storage device (memory) 109. The memory 109 has stored therein control programs for processes corresponding to the flowcharts shown in FIGS. 7, 8, 10 to 12 that will be described later, control programs for dialog boxes used for selecting an output paper and setting a read setting, contents indicating operation screen information as shown in FIGS. 3 to 6, and the like.

Image Processing System

Figure 2:
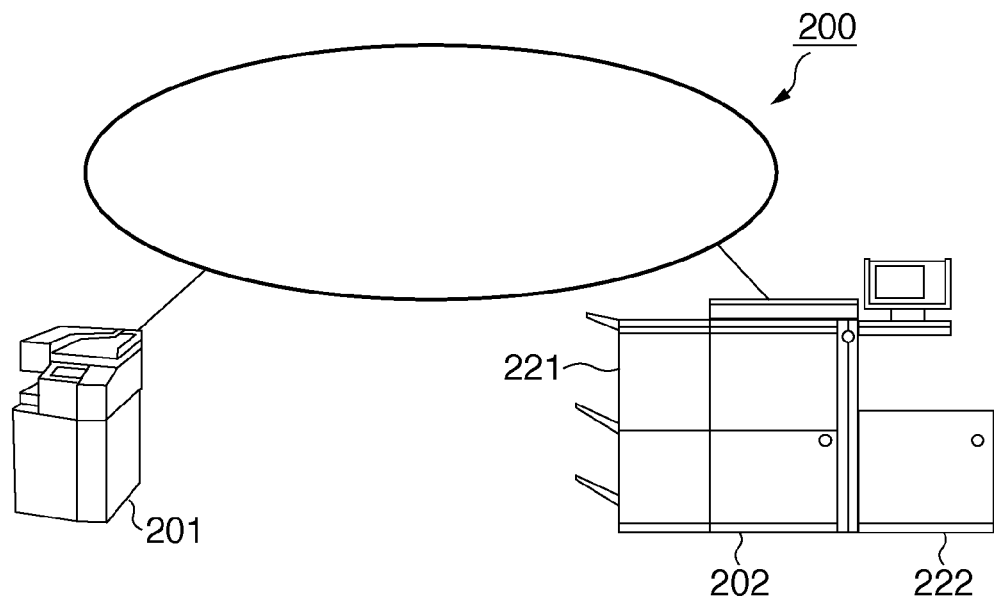
FIG. 2 is a diagram showing an image processing system 200 according to the first exemplary embodiment.

FIG. 2 is a diagram showing an image processing system 200 according to the first exemplary embodiment. Here, as one example, an example of the image processing system 200 including two image processing apparatuses, reference numerals 201 and 202 will be described. However, the image processing system 200 is not limited to the example shown in FIG. 2 and may be configured to include three or more image processing apparatuses.

The image processing apparatus 201 is used as an apparatus on the reading side when the user executes a cooperation job. On the other hand, the image processing apparatus 202 is used as an apparatus on the cooperation job printing side. Hereinafter, the image processing apparatus 201, which functions as a first image processing apparatus, is referred to as a local apparatus 201, and the image processing apparatus 202, which functions as a second image processing apparatus, is referred to as a remote apparatus 202. The local apparatus 201 and the remote apparatus 202 are connected to each other via a network, and can perform mutual communication.

The local apparatus 201 includes a color scanner and can perform color copying. Whereas, the remote apparatus 202 does not include a color copying function, but includes a finisher 221 and a paper deck 222, which are not provided in the local apparatus 201.

Setting Screen

Hereinafter, setting screens displayed on operation units 105 of the local apparatus 201 and the remote apparatus 202 will be described with reference to FIGS. 3 to 6.

Figure 3:
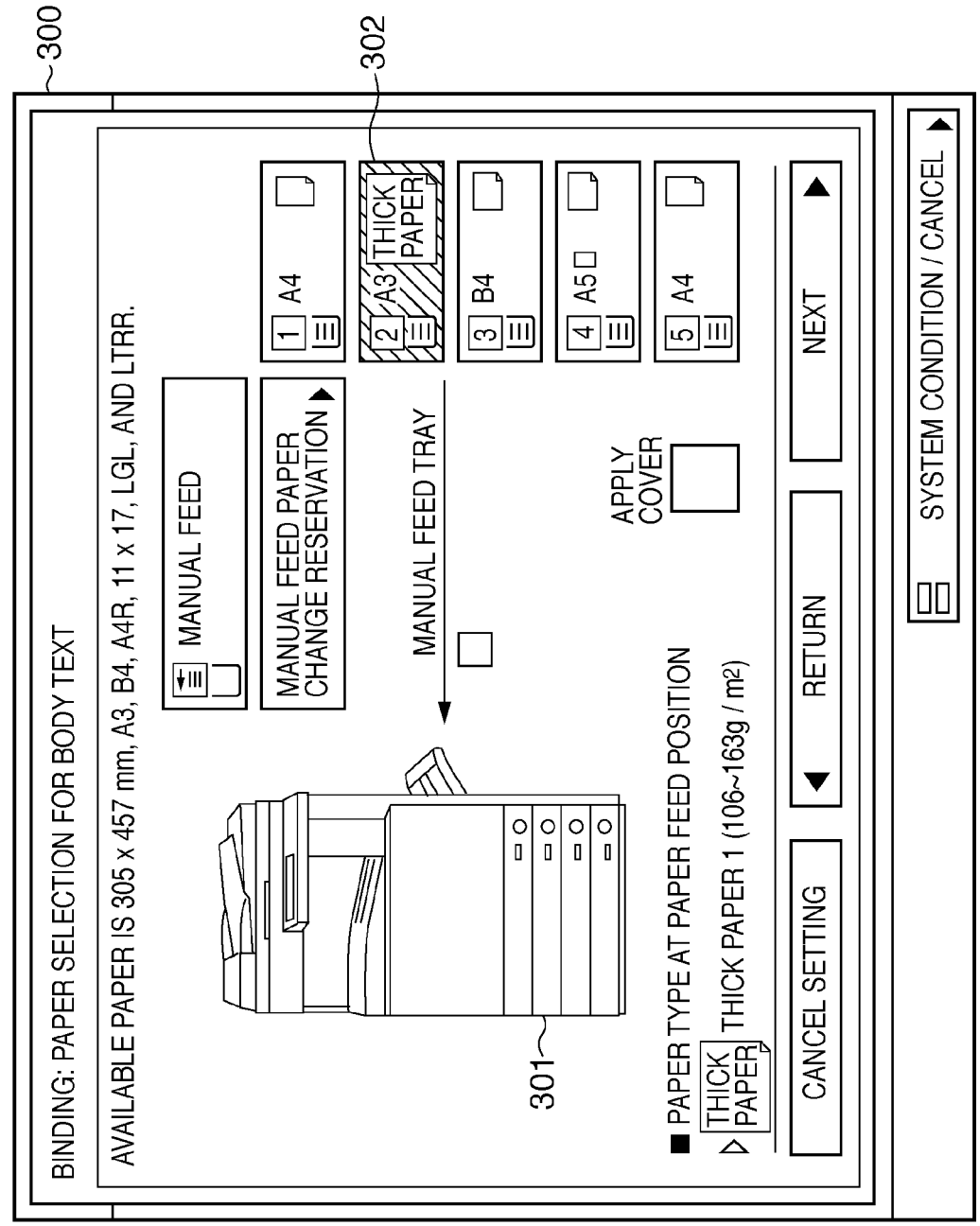
FIG. 3 is a diagram showing one example of a paper selection screen 300 displayed on a local apparatus 201 according to the first exemplary embodiment.

FIG. 3 is a diagram showing one example of a paper selection screen 300 displayed on the local apparatus 201 according to the first exemplary embodiment. The paper selection screen 300 is displayed on the operation unit 105 of the local apparatus 201.

The paper selection screen 300 includes a device configuration 301 showing a device configuration of an image processing apparatus and a paper-feed tray selection button 302 for selecting a paper to be used in executing a job. The paper-feed tray selection button 302 displays an available paper-feed cassette, and the user can select a paper by pressing the button.

Figure 4:
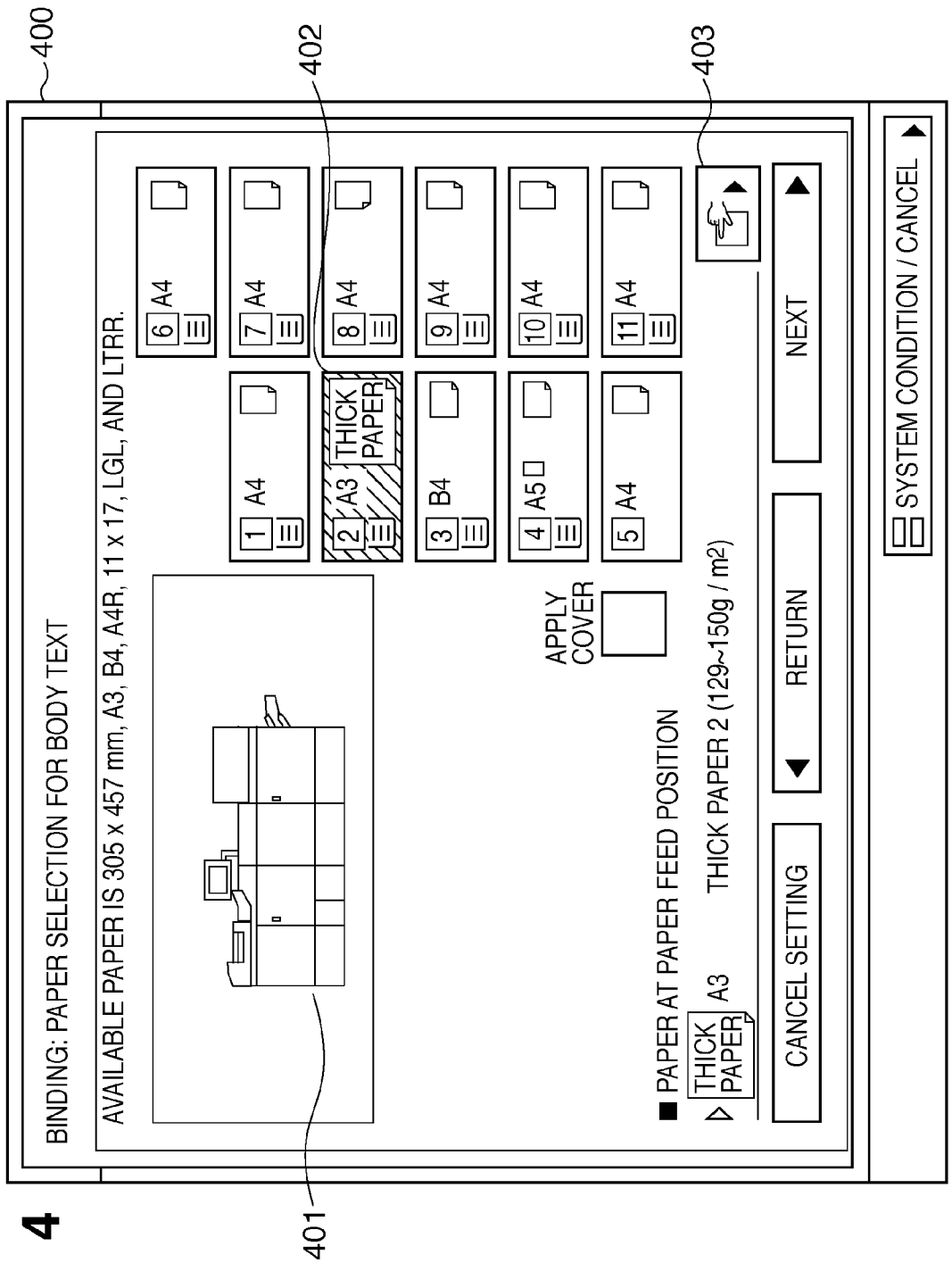
FIG. 4 is a diagram showing one example of a paper selection screen 400 displayed on a remote apparatus 202 according to the first exemplary embodiment.

FIG. 4 is a diagram showing one example of a paper selection screen 400 displayed on the remote apparatus 202 according to the first exemplary embodiment. The paper selection screen 400 is displayed on the operation unit 105 of the remote apparatus 202.

The paper selection screen 400 includes a device configuration 401 showing a device configuration of an image processing apparatus, a paper-feed tray selection button 402 for selecting a sheet used for executing a job, and a detailed paper information button 403 for displaying detailed information regarding a selected paper. Since the local apparatus 201 and the remote apparatus 202 have different device configurations, more paper feed trays are displayed in FIG. 4 compared to those in FIG. 3.

Figure 5:
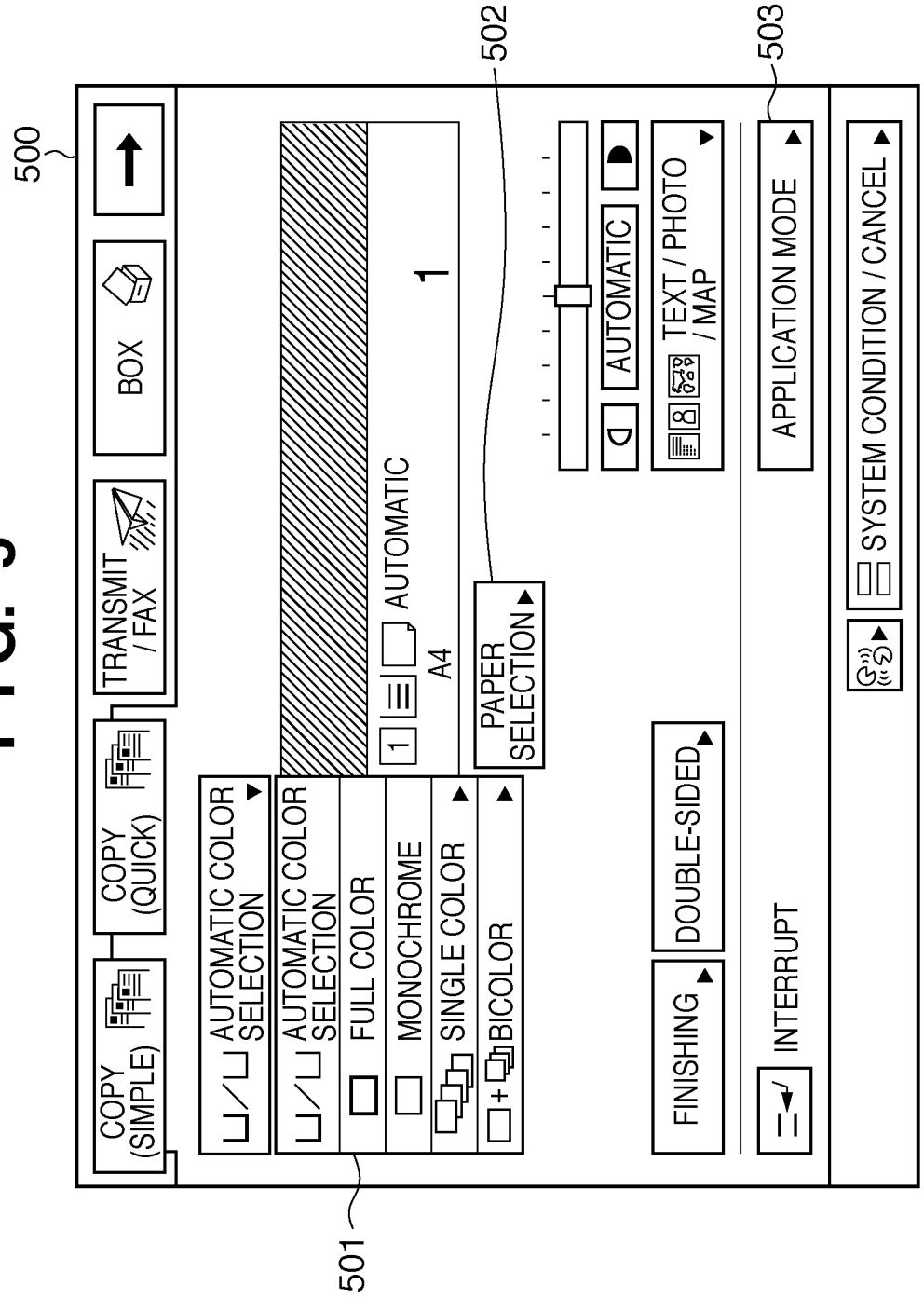
FIG. 5 is a diagram showing one example of a basic copy screen 500 displayed on the local apparatus 201 according to the first exemplary embodiment.

FIG. 5 is a diagram showing one example of a basic copy screen 500 displayed on the local apparatus 201 according to the first exemplary embodiment. The basic copy screen 500 is displayed on the operation unit 105 of the local apparatus 201.

The basic copy screen 500 includes a read-mode selection list 501 for selecting a read mode, a paper selection button 502 for selecting a paper on which a read image is to be printed, and an application mode button 503 for designating various printing methods such as binding. Since the local apparatus 201 according to the present exemplary embodiment includes a color scanner, an automatic color selection mode, a full color mode, a monochrome mode, a single color mode, and a bicolor mode can be selected as the read mode.

Figure 6:
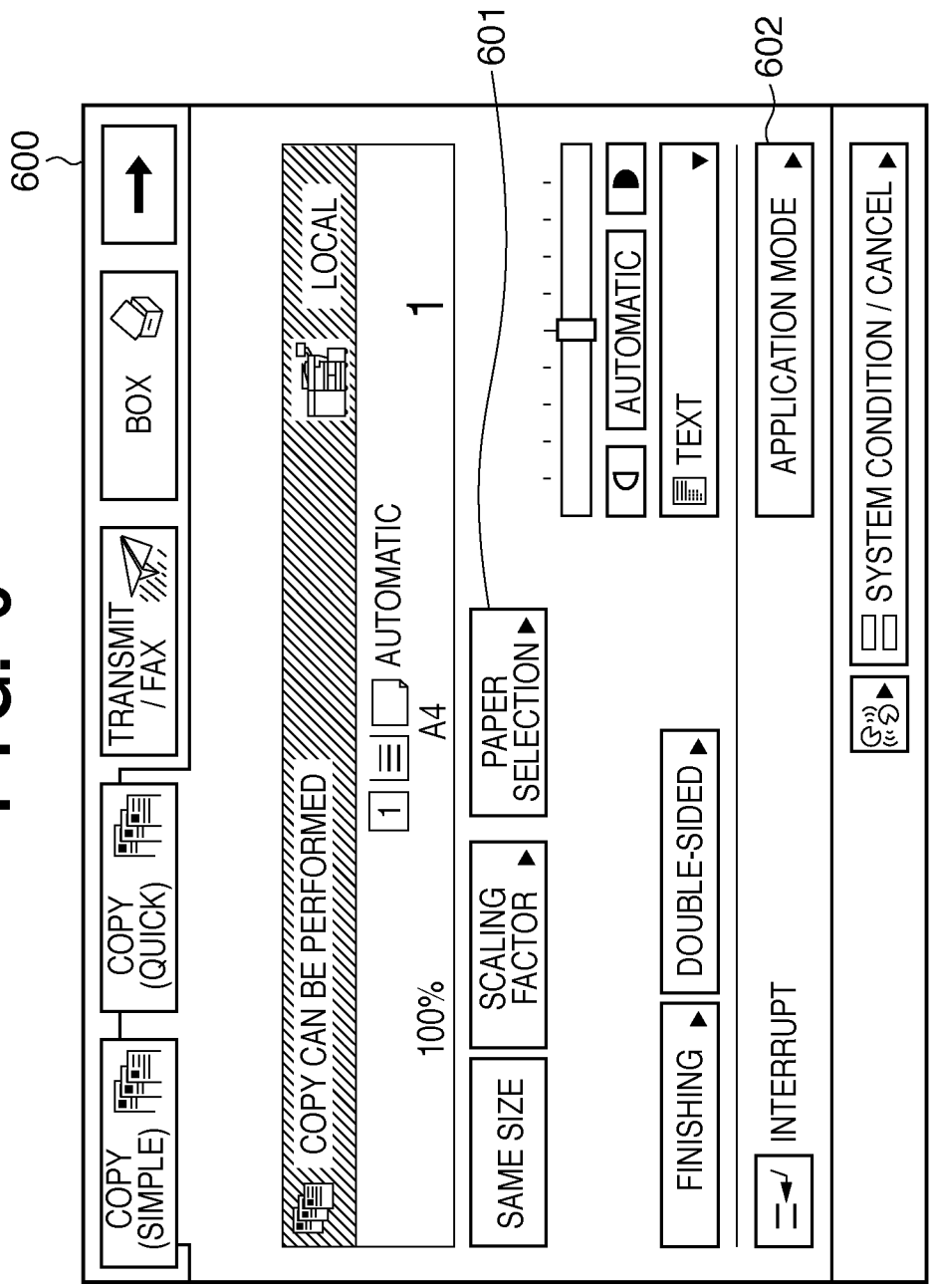
FIG. 6 is a diagram showing one example of a basic copy screen 600 displayed on the remote apparatus 202 according to the first exemplary embodiment.

FIG. 6 is a diagram showing one example of a basic copy screen 600 displayed on the remote apparatus 202 according to the first exemplary embodiment. The basic copy screen 600 is displayed on the operation unit 105 of the remote apparatus 202.

The basic copy screen 600 includes a paper selection button 601 for selecting a paper on which an image read by the scanner unit 104 is to be printed and an application mode button 602, which can be used for designating various printing methods such as binding. Since the remote apparatus 202 has only a monochrome copy function, the screen does not include the read-mode selection list as shown in FIG. 5.

As described above, since the image processing apparatuses have different functions, such operation screens are also different. Accordingly, when a plurality of image processing apparatuses cooperatively execute a job, the operation screens (an input setting screen or an output setting screen) are displayed in consideration of the processing capabilities of the image processing apparatuses.

Processing Flow

Figure 7:
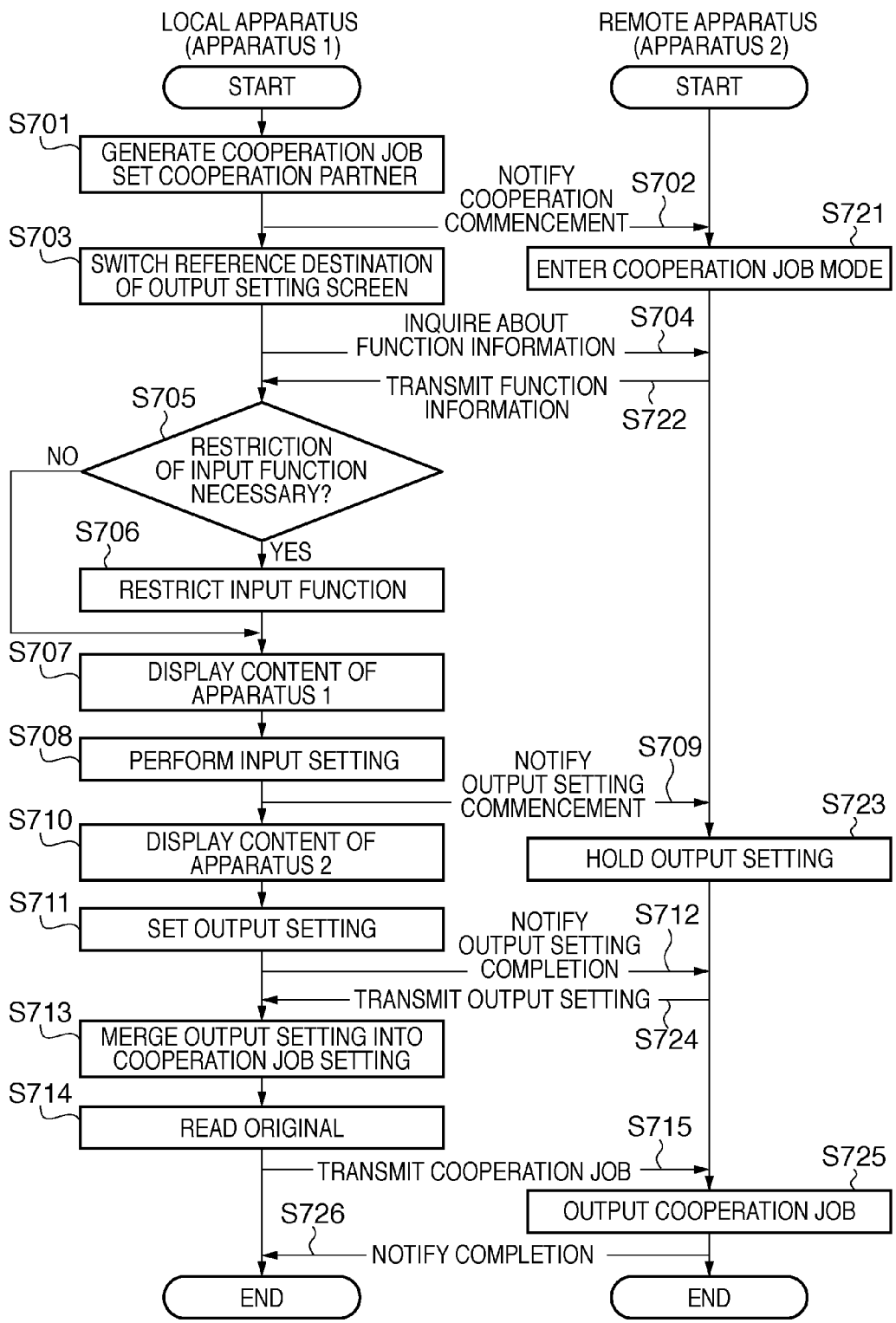
FIG. 7 is a sequence diagram showing a processing procedure performed in the local apparatus 201 and the remote apparatus 202 according to the first exemplary embodiment.

Next, with reference to FIG. 7, a processing flow performed when the plurality of image processing apparatuses according to the present exemplary embodiment cooperatively executes a job will be described. FIG. 7 is a sequence diagram showing a processing procedure performed in the local apparatus 201 and remote apparatus 202 according to the first exemplary embodiment. CPUs 108 of the local apparatus 201 and the remote apparatus 202 perform overall control of the processing described below. Note that in the processing flow shown in FIG. 7, processing shown on the left side is processing performed in the local apparatus 201, and processing shown on the right side is processing performed in the remote apparatus 202. Further, arrows shown between the left processing flow and the right processing flow indicate communication between the local apparatus 201 and the remote apparatus 202.

First, in step S701, the local apparatus 201 issues an instruction to generate a cooperation job and sets a cooperation partner based on information specified by the user via the operation unit 105. Here, the cooperation job is a job cooperatively performed by the plurality of image processing apparatuses. In this case, the cooperation partner of the local apparatus 201 is the remote apparatus 202. Subsequently, in step S702, the local apparatus 201 notifies the remote apparatus 202, which has been set as a cooperation partner, of cooperation job commencement. Here, on receiving the notification of cooperation job commencement in step S702, the remote apparatus 202 enters a cooperation job mode and prepares to receive the cooperation job to be transmitted from the local apparatus 201 in step S721.

Next, in step S703, the local apparatus 201 switches the reference destination of content regarding an output setting screen displayed on the operation unit 105 from content that the local apparatus itself has already stored to content that the remote apparatus 202 stores. Here, in the local apparatus 201, the content regarding an input setting screen is set to content used for performing an operation of the local apparatus itself, and the content regarding the output setting screen is set to content used for performing an operation of the remote apparatus 202. That is, the content regarding the input setting screen is used when the local apparatus 201 performs such job processing alone. On the other hand, the content regarding the output setting screen is used when the remote apparatus 202 performs such job processing alone. By displaying these contents on the local apparatus 201, a setting operation for a cooperation job can be performed in the local apparatus 201. As described above, when such operation screens are displayed on the operation unit 105, the local apparatus 201 displays contents by, for example, downloading the contents from reference destinations. Here, content indicates operation information including information regarding an operation screen for displaying an operation screen such as the input setting screen and the output setting screen, and an operation procedure. Also, the input setting here indicates a setting for causing the scanner unit 104 to read an original when executing a cooperation job. On the other hand, the output setting indicates a setting for causing the image forming unit 101 to output an image corresponding to inputted image data onto a recording material or the like.

Subsequently, after switching the reference destination of the content regarding the output setting screen in step S703, the local apparatus 201 transmits, to the remote apparatus 202, an inquiry about function information regarding the remote apparatus 202 in step S704, and acquires the information. On receiving the inquiry about the function information from the local apparatus 201, in step S722, the remote apparatus 202 transmits, to the local apparatus 201, the function information including a model name, processing capabilities, an option, and the like.

Next, in step S705, based on the function information transmitted from the remote apparatus 202, the local apparatus 201 determines whether or not a function that the local apparatus 201 includes (e.g., an input function) needs to be restricted. For example, as in the present exemplary embodiment, in the case where the local apparatus 201 has a color copying function, but the remote apparatus 202, which is an image processing apparatus acting as a cooperation partner, does not have a color copying function, a setting regarding color reading is disabled. Therefore, the local apparatus 201 determines whether or not an input function needs to be restricted by comparing the processing capabilities of the local apparatus 201 (function information) to the processing capabilities of the remote apparatus 202.

If restriction is determined to be necessary based on the determination result in step S705, the local apparatus 201 sets a restriction on the input function in step S706. Specifically, the display is controlled so that a color setting cannot be selected on the input setting screen in order to restrict a setting regarding color reading. On the other hand, if restriction is determined to be unnecessary, the local apparatus 201 does not set a restriction on the input function, and processing proceeds to step S707.

Next, in step S707, the local apparatus 201 displays content indicating the operation screen information on the operation unit 105 of the local apparatus 201. The setting screen displayed here is an input setting screen used for performing an input (read) setting. Subsequently, in step S708, the local apparatus 201 decides the input setting regarding a cooperation job based on information input by the user via the input setting screen. After that, in step S709, the local apparatus 201 transmits a notification of output setting commencement indicating commencement of output setting to the remote apparatus 202.

On receiving the notification of output setting commencement, in step S710, the local apparatus 201 displays the output setting screen whose reference destination was switched to content that the remote apparatus 202 stores in step S703 on the operation unit 105 of the local apparatus 201. The display is also controlled here so as to restrict a function in consideration of the processing capabilities of the local apparatus 201. The image processing apparatus that is assumed to be used in the present exemplary embodiment does not need function restriction here and, thus, description thereof will be omitted. After that, in step S711, the local apparatus 201 sets an output setting for the cooperation job based on the information input by the user via the output setting screen. Subsequently, in step S712, the local apparatus 201 transmits a notification of output setting completion indicating completion of output setting to the remote apparatus 202.

On the other hand, on receiving the notification of output setting commencement, in step S723, the remote apparatus 202 starts processing to hold the output setting for the cooperation job set via the output setting screen in a storage device of the remote apparatus 202. This processing will be continued until the notification of output setting completion from the local apparatus 201 is received. After that, on receiving the notification of output setting completion from the local apparatus 201 in step S712, in step S724, the remote apparatus 202 transmits information regarding the output setting for the cooperation job held in step S723 to the local apparatus 201.

On receiving the information regarding the output setting for the cooperation job transmitted from the remote apparatus 202, in step S713, the local apparatus 201 reflects information regarding the output setting in the output setting for the cooperation job that was generated in step S701 and for which the input setting was performed in step S708. That is, the input setting information and the output setting information are composed here. Subsequently, after a setting regarding the cooperation job was completed in step S713, in step S714, the local apparatus 201 reads an original that will be an input original of the cooperation job using the scanner unit 104 of the local apparatus 201. When reading of the original is completed, in step S715, the local apparatus 201 transmits a setting for the cooperation job and the read image data to the remote apparatus 202.

On receiving the cooperation job, in step S725, the remote apparatus 202 prints the image data in accordance with the output setting set in step S711. When printing ends, in step S726, the remote apparatus 202 transmits a notification of completion indicating completion of the cooperation job to the local apparatus 201, and processing in the remote apparatus ends. After that, the local apparatus 201 receives a notification of completion from the remote apparatus 202, and processing in the local apparatus ends.

As described above, in the image processing system according to the present exemplary embodiment, the local apparatus 201 acquires the function information regarding the remote apparatus 202 and controls the display contents of the setting screen used by the operator to set a job setting based on the acquired function information and the function information of the local apparatus itself. Accordingly, in the present image processing system, when executing a cooperation job, setting can be performed in accordance with the processing capabilities of the image processing apparatuses. That is, a restriction is imposed on a setting screen in accordance with the respective processing capabilities of a plurality of image processing apparatuses in cooperation and, thus, the operator can be prevented from performing an incorrect operation (an operation that will result in an error if the operator tries to perform it).

Note that the present invention is not limited to the aforementioned present exemplary embodiment, but various modifications are applicable. For example, the local apparatus 201 may display the input setting screen by referring to the operation information that the local apparatus 201 has, and may display the output setting screen by referring to the operation information that the remote apparatus 202 has. Consequently, when executing a cooperation job, a setting screen can be displayed in accordance with the roles that the image processing apparatuses perform (input of image data, printing, etc.) and, thus, operability can be further improved. Also, by using the operation screens of the image processing apparatuses, the restriction of a function can be performed with ease. This can reduce processing for function restriction, for example, if the remote apparatus 202 does not have a color printing function, the display contents of the operation screen do not need to be changed since a portion for setting color printing is not in the operation screen of the remote apparatus 202.

Second Exemplary Embodiment

Next, a second exemplary embodiment will be described with reference to FIG. 8. In the first exemplary embodiment, an output setting regarding the cooperation job received from the remote apparatus 202 is composed on the local apparatus 201 side, and the composed setting is transmitted to the remote apparatus 202 with a read image. In the present exemplary embodiment, a method for referring to the output setting that is held in the remote apparatus 202 when an actual output operation is performed will be described.

Figure 8:
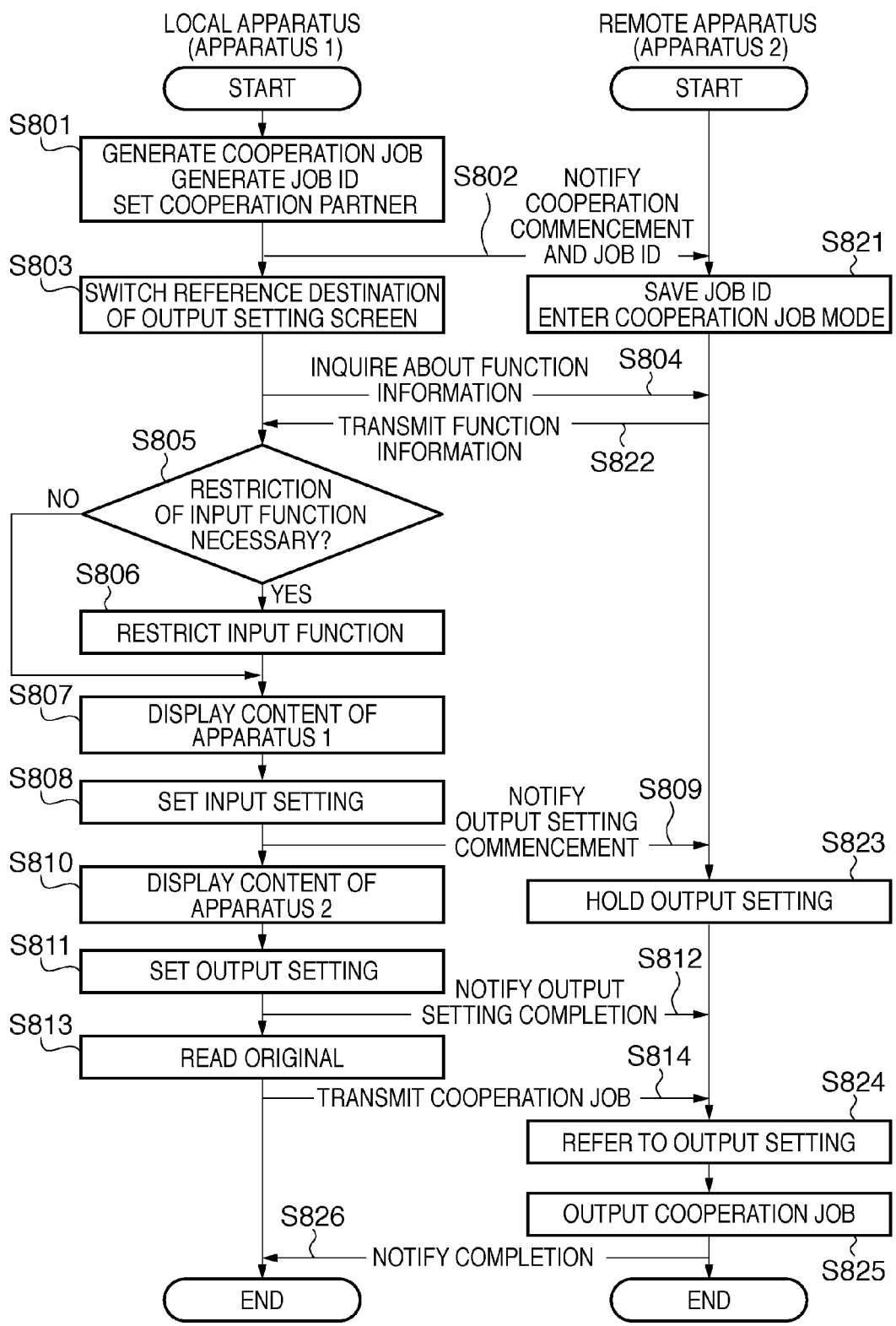
FIG. 8 is a sequence diagram showing a processing procedure performed in the local apparatus 201 and the remote apparatus 202 according to a second exemplary embodiment.

FIG. 8 is a sequence diagram showing a processing procedure performed in the local apparatus 201 and the remote apparatus 202 according to the second exemplary embodiment. The CPUs 108 of the local apparatus 201 and the remote apparatus 202 perform overall control of the processing described below. Note that, in the processing flow shown in FIG. 8, processing shown on the left side is processing performed in the local apparatus 201, and processing shown on the right side is processing performed in the remote apparatus 202. Further, arrows shown between the left processing flow and the right processing flow indicate communication between the local apparatus 201 and the remote apparatus 202. It should be noted that descriptions that are the same as that of FIG. 7 will be omitted.

First, in step S801, the local apparatus 201 issues an instruction to generate a cooperation job and sets a cooperation partner based on information specified by the user via the operation unit 105. Furthermore, the local apparatus 201 generates a unique job ID for uniquely specifying a cooperation job and assigns the ID to the job. Subsequently, in step S802, the local apparatus 201 transmits a notification indicating commencement of the cooperation job and the job ID generated in step S801 to the remote apparatus 202, which has been set as a cooperation partner. Here, on receiving the notification of cooperation job commencement and the job ID, in step S821, the remote apparatus 202 stores the transmitted cooperation job ID and prepares to receive the cooperation job to be transmitted from the local apparatus 201.

Next, in step S803, the local apparatus 201 switches a reference destination of content regarding an output setting screen displayed on the operation unit 105 from content that the local apparatus 201 stores to content that the remote apparatus 202 stores. Here, in the local apparatus 201, the reference destination of content regarding an input setting screen is set to content the local apparatus itself stores, and the reference destination of content regarding the output setting screen is set to content that the remote apparatus 202 stores.

Subsequently, after switching the reference destination of the content regarding the output setting screen in step S803, the local apparatus 201 transmits an inquiry about function information regarding the remote apparatus 202 to the remote apparatus 202 in step S804, and acquires the information. In step S822, the remote apparatus 202 transmits, to the local apparatus 201, the function information including a model name, processing capabilities, an option, and the like.

Next, in step S805, based on the function information transmitted from the remote apparatus 202, the local apparatus 201 determines whether or not a function that the local apparatus 201 includes needs to be restricted. If restriction is determined to be necessary, the local apparatus 201 sets a restriction on the input function in step S806. Here, a setting regarding color reading is restricted (prohibited). On the other hand, if restriction is determined to be unnecessary, the local apparatus 201 does not set a restriction on the input function, and processing proceeds to step S807.

Next, in step S807, the local apparatus 201 displays content indicating operation screen information on the operation unit 105 of the local apparatus 201. Subsequently, in step S808, the local apparatus 201 sets an input setting for a cooperation job based on information input by the user via the input setting screen. After that, in step S809, the local apparatus 201 transmits a notification of output setting commencement indicating commencement of output setting to the remote apparatus 202.

On receiving the notification of output setting commencement, in step S810, the local apparatus 201 displays an output setting screen whose reference destination was switched to content that the remote apparatus 202 stores in step S803 on the operation unit 105 of the local apparatus 201. After that, in step S811, the local apparatus 201 sets an output setting for the cooperation job based on information inputted by the user via the output setting screen. Subsequently, in step S812, the local apparatus 201 transmits a notification of output setting completion indicating completion of output setting to the remote apparatus 202.

On the other hand, on receiving the notification of output setting commencement, in step S823, the remote apparatus 202 starts processing to hold the output setting for the cooperation job set via the output setting screen in the storage device functioning as an output setting storage unit of the remote apparatus 202. At this time, the output setting for the cooperation job is held in association with the job ID of the cooperation job received in step S821.

In step S813, the local apparatus 201 reads an original that will be an input original of the cooperation job using the scanner unit of the local apparatus 201. When reading of the original is completed, in step S814, the local apparatus 201 adds the cooperation job ID and transmits a setting for the cooperation job and the read image data to the remote apparatus 202.

On receiving the cooperation job, in step S824, the remote apparatus 202 refers to the output setting stored in the storage device of the remote apparatus 202 based on the notified cooperation job ID. At this time, the remote apparatus 202 searches the output setting using the transmitted job ID as a search keyword. Subsequently, the remote apparatus 202 prints the image data in accordance with the output setting in step S825. Further, when printing ends, in step S826, the remote apparatus 202 transmits a notification of completion indicating completion of the cooperation job to the local apparatus 201, and processing in the remote apparatus ends. After that, the local apparatus 201 receives the notification of completion from the remote apparatus 202, and processing in the local apparatus ends.

As described above, in the image processing system according to the present exemplary embodiment, the output setting information input via the output setting screen may be held in the remote apparatus 202. In this case, when outputting an image in accordance with image data, the remote apparatus 202 refers to the output setting information that the apparatus holds and executes output. Consequently, compared to the first exemplary embodiment, processing for transmitting the output setting information from the remote apparatus 202 to the local apparatus 201 can be omitted. In addition, as described above, when the image processing apparatuses hold the settings of processing performed in the apparatuses themselves, a unique ID for each job is preferably assigned. Accordingly, each piece of setting information can be controlled with ease.

Third Exemplary Embodiment

Next, a third exemplary embodiment will be described with reference to FIGS. 9 to 11. In the first and second exemplary embodiments, based on the function information received from the remote apparatus 202, the local apparatus 201 performs determination and function restriction. However, in the present exemplary embodiment, an authentication server is added to the image processing system, the function information received from the remote apparatus 202 is transmitted to the authentication server and, then, according to function restriction information based on that result, function restriction is performed. That is, the image processing system according to the present exemplary embodiment further includes an authentication server that performs function restriction.

FIG. 9 is a diagram showing an image processing system 900 according to the third exemplary embodiment. The image processing system 900 includes a local apparatus 901, a remote apparatus 902, and an authentication server 903.

The local apparatus 901 is an image processing apparatus used as an apparatus on the reading side when a user executes a cooperation job. The remote apparatus 902 is an image processing apparatus used as an apparatus on the cooperation job printing side. The local apparatus 901 includes a color scanner and can perform color copying. Whereas, the remote apparatus 902 does not have a color copying function, but includes a finisher 921 and a paper deck 922, which are not provided in the local apparatus 901.

The authentication server 903 is connected to a network with the local apparatus 901 and the remote apparatus 902. Based on function information notified from the image processing apparatuses, the authentication server 903 transmits function restriction information indicating function restriction to an image processing apparatus that notified it of the function information.

Figure 10:
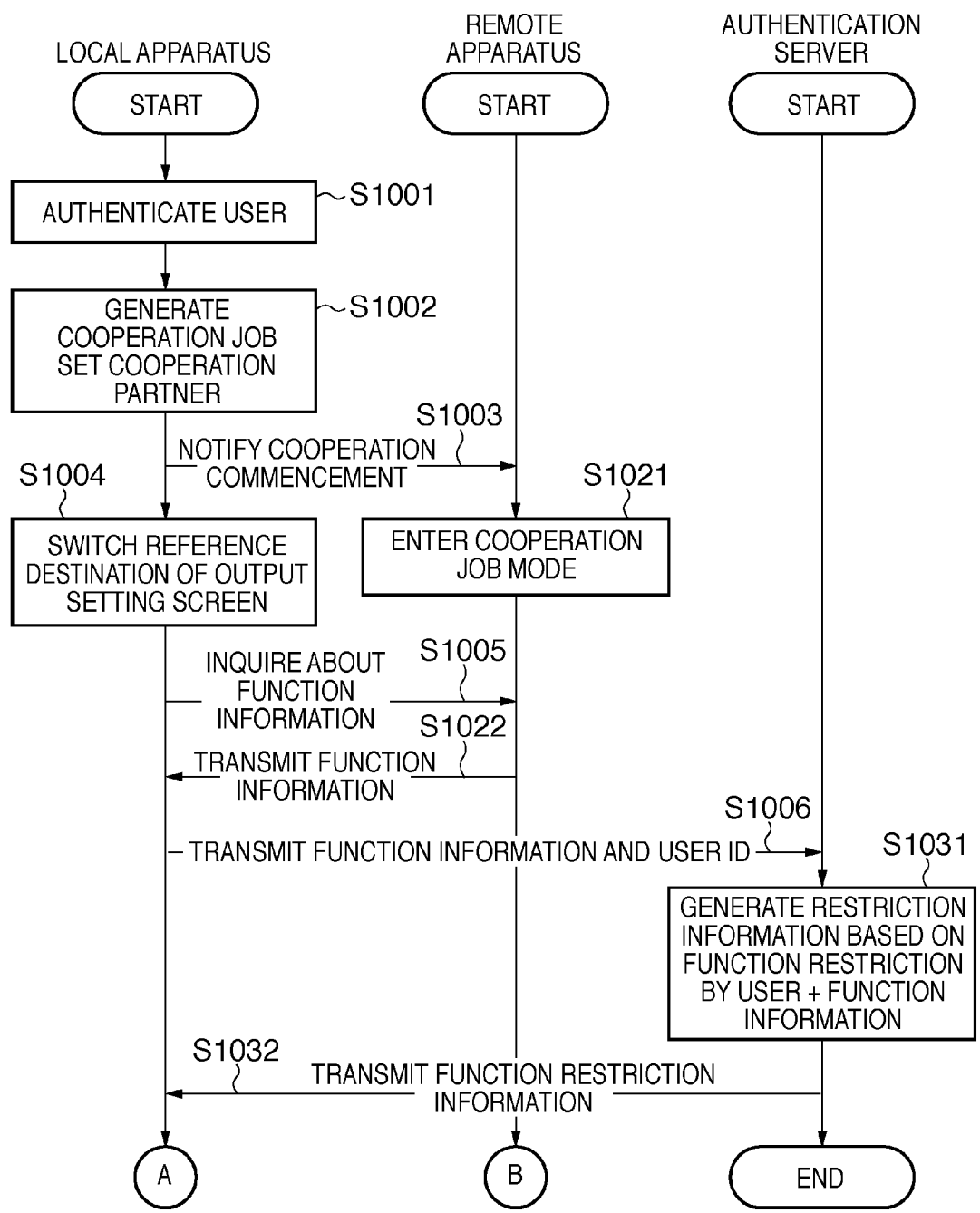
FIG. 10 is a sequence diagram showing a processing procedure performed in the image processing system 900 according to the third exemplary embodiment up to when function restriction has been generated when executing a cooperation job.
Figure 11:
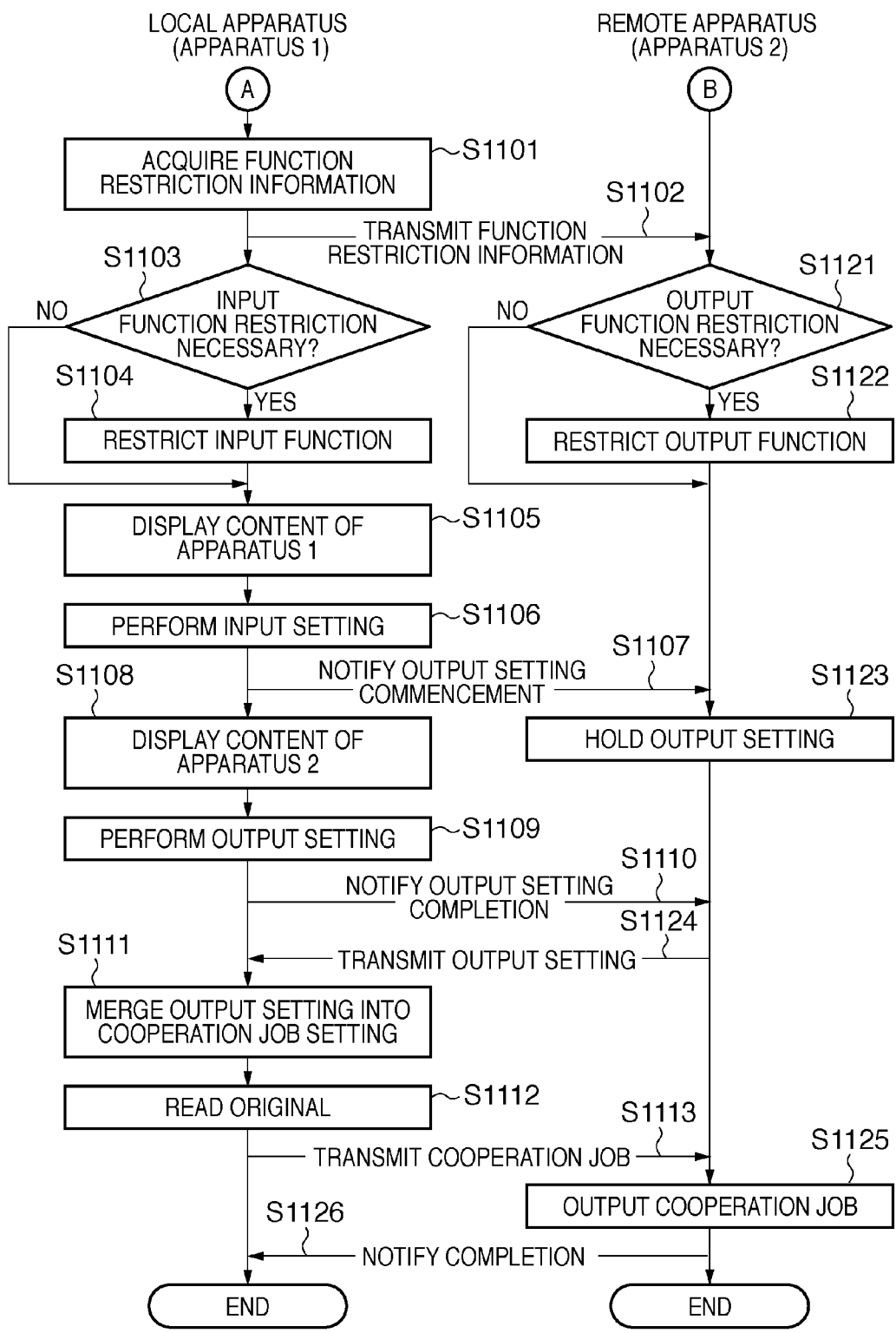
FIG. 11 is a sequence diagram showing a processing procedure performed in the image processing system 900 from when function restriction information is acquired from an authentication server 903 according to the third exemplary embodiment.

FIG. 10 is a sequence diagram showing a processing procedure performed in the image processing system 900 according to the third exemplary embodiment up to when function restriction has been generated when performing a cooperation job. The processing shown in FIG. 10 is performed before the cooperation job is executed. CPUs of the local apparatus 901, the remote apparatus 902, and the authentication server 903 perform overall control of the processing described below. Note that in the processing flow shown in FIG. 9, processing shown on the left side is processing performed in the local apparatus 901, and processing shown in the center is processing performed in the remote apparatus 902, and processing shown on the right side is processing performed in the authentication server 903. Further, arrows shown between the processing flows indicate communication between the apparatuses.

First, in step S1001, the local apparatus 901 performs authentication of a user using the apparatus from information input by the user via an operation unit 105. This user authentication may be performed by comparing a user ID and a password that are input by the user to information that was held in advance. Subsequently, in step S1002, the local apparatus 901 generates a cooperation job in accordance with an input from the user and sets the remote apparatus 902 as a cooperation partner. After that, in step S1003, the local apparatus 901 transmits a notification of cooperation commencement indicating commencement of the cooperation job to the remote apparatus 902, which has been set as the cooperation partner. On receiving the notification of cooperation commencement, in step S1021, the remote apparatus 902 enters a cooperation job mode, and prepares to receive a cooperation job to be transmitted from the local apparatus 901.

Next, in step S1004, the local apparatus 901 switches a reference destination of content regarding an output setting screen displayed on the operation unit 105 from content that the local apparatus 901 stores to content that the remote apparatus 902 stores. Here, in the local apparatus 901, a reference destination of the content regarding an input setting screen is set to content the local apparatus itself stores, and the reference destination of the content regarding the output setting screen is set to content that the remote apparatus 902 stores.

Subsequently, after switching the reference destination of the content regarding the output setting screen in step S1004, the local apparatus 901 transmits, to the remote apparatus 902, an inquiry about function information regarding the remote apparatus 902 in step S1005, and acquires the information. Here, a CPU 108 of the local apparatus 901 functions as a first acquisition unit. In step S1022, the remote apparatus 902 transmits, to the local apparatus 901, the function information including a model name, processing capabilities, an option, and the like.

Next, in step S1006, the local apparatus 901 transmits, to the authentication server, a user ID of a user authenticated in step S1001 and the function information received from the remote apparatus 902 in step S1022. In step S1031, the authentication server 903 generates function restriction information based on function restriction information from the user and the function information regarding the remote apparatus 902. For example, if the remote apparatus 902, which performs processing for a cooperation job, does not have a color copying function, the authentication server 903 generates function restriction information for restricting color reading even if the user using the apparatus is permitted to perform color reading. After that, in step S1032, the authentication server 903 transmits the function restriction information generated in step S1031 to the local apparatus 901.

Subsequently, processing after generation of the function restriction information shown in FIG. 10 will be described with reference to FIG. 11. FIG. 11 is a sequence diagram showing a processing procedure performed in the image processing system 900 from when the function restriction information is acquired from the authentication server 903 according to the third exemplary embodiment. Note that A and B shown in FIG. 10 continue to A and B shown in FIG. 11.

In step S1101, the local apparatus 901 acquires the function restriction information transmitted from the authentication server in step S1032. Here, the CPU 108 of the local apparatus 901 functions as a second acquisition unit. Subsequently, in step S1102, the local apparatus 901 transmits the received function restriction information to the remote apparatus 902.

Next, in step S1103, the local apparatus 901 determines whether or not the input function that the local apparatus 901 includes needs to be restricted based on the function restriction information transmitted from the authentication server. If restriction is determined to be necessary, in step S1104, the local apparatus 901 sets a restriction on the input function. On the other hand, if restriction is determined to be unnecessary, the local apparatus 901 does not set a restriction on the input function, and processing proceeds to step S1105.

Next, in step S1105, the local apparatus 901 displays content indicating operation screen information on the operation unit 105 of the local apparatus 901. Subsequently, in step S1106, the local apparatus 901 sets an input setting for a cooperation job based on information inputted by the user via the input setting screen. After that, in step S1107, the local apparatus 901 transmits, to the remote apparatus 902, a notification of output setting commencement indicating commencement of output setting.

On the other hand, on receiving the function restriction information, in step S1121, the remote apparatus 902 determines whether or not an output function that the remote apparatus 902 includes needs to be restricted based on the function restriction information. If restriction is determined to be necessary, in step S1122, the remote apparatus 902 sets a restriction on the output function. Specifically, the remote apparatus 902 changes information in the content so as to restrict the display contents of the output setting screen. On the other hand, if restriction is determined to be unnecessary, the remote apparatus 902 does not set a restriction on the output function, and processing proceeds to step S1123.

When the notification of output setting commencement is transmitted, in step S1108, the local apparatus 901 displays the output setting screen whose reference destination was switched to content stored in the remote apparatus 902 in step S1004 on the operation unit 105 of the local apparatus 901. After that, in step S1109, the local apparatus 901 sets an output setting for the cooperation job based on information input by the user via the output setting screen. Subsequently, in step S1110, the local apparatus 901 transmits, to the remote apparatus 902, a notification of output setting completion indicating completion of output setting.

On the other hand, on receiving the notification of output setting commencement, in step S1123, the remote apparatus 902 starts processing to hold the output setting for the cooperation job set via the output setting screen in the storage device of the remote apparatus 902. After that, on receiving the notification of output setting completion from the local apparatus 901, in step S1124, the remote apparatus 902 transmits the held output setting for the cooperation job to the local apparatus 901.

In step S1111, the local apparatus 901 reflects the output setting for the cooperation job transmitted from the remote apparatus 902 in step S1124 on the output setting for the cooperation job. After that, in step S1112, the local apparatus 901 reads an original that will be an input original of the cooperation job using the scanner unit. When reading of the original has been completed, in step S1113, the local apparatus 901 transmits the cooperation job setting and the read image data to the remote apparatus 902.

On receiving the cooperation job, in step S1125, the remote apparatus 902 prints the image data in accordance with the output setting. When printing ends, in step S1126, the remote apparatus 902 transmits a notification of completion indicating completion of the cooperation job to the local apparatus 901, and processing in the remote apparatus ends. After that, the local apparatus 901 receives the notification of completion from the remote apparatus 902, and processing in the local apparatus ends.

As described above, the image processing system according to the present exemplary embodiment includes the authentication server 903, which generates function restriction information from function information regarding the image processing apparatuses, in addition to the configurations of the first and second exemplary embodiments. Accordingly, compared to the image processing systems according to the first and second exemplary embodiments, the authentication server can perform determination of function restriction with respect to the job and, thus, the processing burden on the local apparatus 901 can be reduced. Also, the authentication server 903 performs function restriction in accordance with the processing capabilities of the apparatuses and control of function restriction performed by each user and, thus, control regarding function restriction can be centralized, and system configuration can be simplified.

Fourth Exemplary Embodiment

Next, a fourth exemplary embodiment will be described with reference to FIG. 12. In the third exemplary embodiment, when performing an output setting for a cooperation job, content regarding the output setting stored in the remote apparatus 902 is displayed on the operation unit 105 of the local apparatus 901, and setting is performed. However, in the present exemplary embodiment, a method in which each apparatus downloads a program module that has been divided into a functional unit, downloads a necessary module for processing from a partner apparatus, and executes the module is described. Therefore, a processing procedure for generating function restriction information in the present exemplary embodiment is similar to that in FIG. 10 and, thus, a description thereof will be omitted. Further, the embodiment below will be described as a modified example relative to the third exemplary embodiment; however, the embodiment can be applied as a modified example of the first and second exemplary embodiments.

Figure 12:
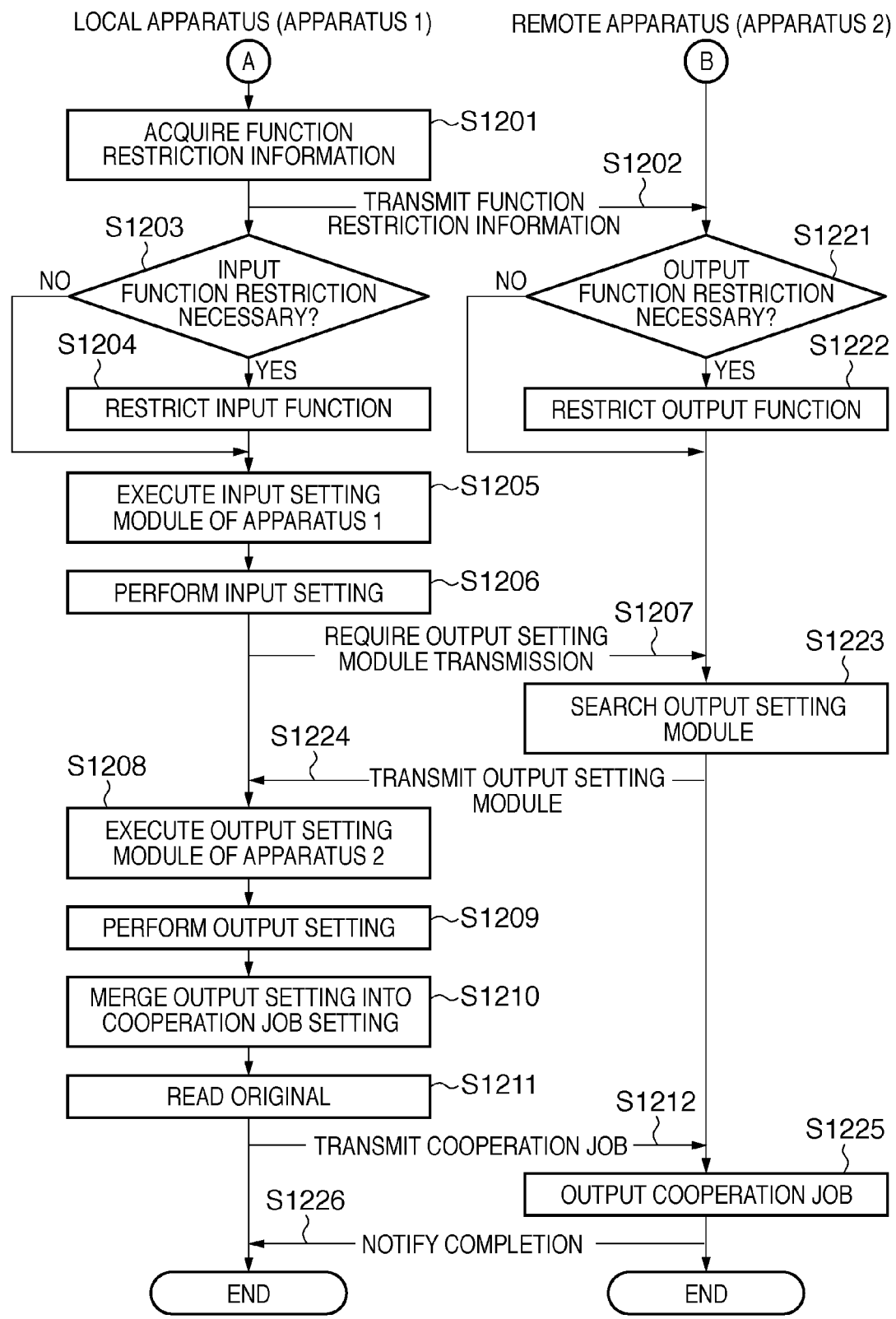
FIG. 12 is a sequence diagram showing a processing procedure performed in the image processing system 900 from when function restriction information is acquired from the authentication server 903 according to a fourth exemplary embodiment.

FIG. 12 is a sequence diagram showing a processing procedure performed in the image processing system 900 from when function restriction information is acquired from the authentication server 903 according to the fourth exemplary embodiment. Note that A and B shown in FIG. 10 continue to A and B shown in FIG. 12.

In step S1201, the local apparatus 901 receives the function restriction information transmitted from the authentication server in step S1032. Subsequently, in step S1202, the local apparatus 901 transmits the received function restriction information to the remote apparatus 902.

Next, in step S1203, based on the function restriction information transmitted from the authentication server, the local apparatus 901 determines whether or not a restriction on a function that the local apparatus 901 includes is necessary. If restriction is determined to be necessary, in step S1204, the local apparatus 901 sets a restriction on the input function. On the other hand, if restriction is determined to be unnecessary, the local apparatus 901 does not set a restriction on the input function, and processing proceeds to step S1205.

Next, in step S1205, the local apparatus 901 executes a program module (input setting module) that realizes an input setting function for the cooperation job and is stored in the storage device of the local apparatus 901. Subsequently, in step S1206, the local apparatus 901 sets an input setting for the cooperation job by using the input setting module.

On the other hand, on receiving function restriction information, in step S1221, the remote apparatus 902 determines whether or not the output function that the remote apparatus 902 includes needs to be restricted based on the function restriction information. If restriction is determined to be necessary, in step S1222, the remote apparatus 902 sets a restriction on the output function. Specifically, the remote apparatus 902 changes program module contents so as to restrict the display contents of the output setting screen. On the other hand, if restriction is determined to be unnecessary, the remote apparatus 902 does not set a restriction on the output function, and processing proceeds to step S1223.

When the input setting ends in step S1206, in step S1207, the local apparatus 901 requires the remote apparatus 902 to transmit a program module (output setting module) that realizes an output setting function. On receiving the request for transmitting the output setting module, in step S1223, the remote apparatus 902 searches an output setting module stored in the storage device of the remote apparatus 902 and acquires the module. Further, in step S1224, the remote apparatus 902 transmits the acquired output setting module to the local apparatus 901.

On receiving the output setting module, in step S1208, the local apparatus 901 executes the output setting module. After that, in step S1209, the local apparatus 901 sets the output setting for the cooperation job by using the output setting module. Subsequently, in step S1210, the local apparatus 901 composes the input setting set in step S1206 and the output setting set in step S1209. After that, in step S1211, the local apparatus 901 reads an original that will be an input original of the cooperation job using the scanner unit. When reading of the original has been completed, in step S1212, the local apparatus 901 transmits a cooperation job setting and the read image data to the remote apparatus 902.

On receiving the cooperation job, in step S1225, the remote apparatus 902 prints the image data in accordance with the transmitted output setting. When printing ends, in step S1226, the remote apparatus 902 notifies the local apparatus 901 of cooperation job completion, and processing in the remote apparatus ends. On the other hand, when the local apparatus 901 receives the notification of completion from the remote apparatus 902, processing in the local apparatus ends.

As described above, in the image processing system according to the present exemplary embodiment, the local apparatus 901 displays an input setting screen by executing a program module that the local apparatus 901 has. Also, the local apparatus 901 may display an output setting screen by executing the program module that the remote apparatus 902 has. Consequently, the present invention can be applied to the image processing system in which a cooperation job is executed by composing a plurality of program modules. Moreover, by causing an apparatus to acquire a program module and execute a job, apparatuses that have different specifications (a different job format or the like) can cooperate.

Note that in the aforementioned description, a cooperation job was described as an example job in which image data acquired by reading an image from an original using a scanner of an apparatus is transmitted, and another apparatus that receives the data prints the image with a printer based on the image data. However, the present invention is not limited to this and can also be applied to various cooperation jobs. That is, examples of such cooperation jobs include a job in which data that was received from another apparatus and saved in a memory is transferred to a cooperation partner apparatus so as to be printed, a job in which image data read using a scanner is transferred to a cooperation partner apparatus, and thereafter the data is transmitted using a transmission function (e-mail, facsimile, etc.), and the like.

The exemplary embodiments of the present invention have been described in detail above; however, the present invention may be applied to a system constituted from a plurality of devices, and may also be applied to an apparatus constituted from one device. In the aforementioned exemplary embodiments, although an MFP is described as an example of an image processing apparatus, the present invention can also be applied to various apparatuses used for processing an image, such as a printer, a scanner, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126452 filed on May 13, 2008, which is hereby incorporated by reference herein in its entirety.

What is claimed is:

1. A first image processing apparatus for executing a job in cooperation with a second image processing apparatus being connectable to the first image processing apparatus via a network, the first image processing apparatus comprising:
  a scanner that scans an image on an original and generates image data;
  a receiver that receives, from the second image processing apparatus, function information of the second image processing apparatus, which prints the image data generated by the scanner;
  a processor coupled to a memory and programmed to function (i) a determination unit that determines whether or not the second image processing apparatus has a color print capability based on the function information received by the receiver, (ii) a display control unit that, in a case where the determination unit has determined that the second image processing apparatus has the color print capability, and the first image processing apparatus has the color scan capability, controls display of a scan setting screen on a display device according to a job to be performed, such that settings of both the color scan function and monochrome scan function are selectable on the scan setting screen by a user, in a case where the determination unit has determined that the second image processing apparatus does not have the color print capability, and the first image processing apparatus has the color scan capability, controls display of the scan setting screen, such that settings of the color scan function are not selectable and settings of the monochrome scan function are selectable on the scan setting screen by a user, and (iii) a decision unit that decides a scan setting for the job in accordance with information inputted via the scan setting screen; and
  a transmitter that transmits the image data generated by scanning the image in accordance with the scan setting decided by the decision unit to the second image processing apparatus.

2. The first image processing apparatus according to claim 1, wherein the display control unit refers to operation information including information on an operation screen and an operation procedure that the first image processing apparatus has, and causes the display device to display the scan setting screen when setting a scan setting for scanning the image, and
  switches a reference destination to operation information that the second image processing apparatus has, and causes the display device to display a print setting screen when setting a print setting for printing the image data.

3. The first image processing apparatus according to claim 1, wherein the display control unit causes the display device to display the scan setting screen by executing a program module that the first image processing apparatus has when setting a scan setting for scanning the image, and
  causes the display device to display a print setting screen by acquiring and executing a program module that the second image processing apparatus has when setting an print setting for printing the image data.

4. The first image processing apparatus according to claim 1, wherein
  the receiver receives, from the second image processing apparatus, print setting information inputted via a print setting screen,
  the processor is programmed to function as a composition unit that composes scan setting information inputted via the scan setting screen and the print setting information received by the receiver, and
  the decision unit decides on the scan setting and a print setting from settings for the job in accordance with information composed by the composition unit.

5. The first image processing apparatus according to claim 1, wherein the processor is programmed to function as an assignment unit that assigns the job a unique ID, and a notification unit that notifies the second image processing apparatus of the assigned ID, wherein
  the transmitter adds the assigned ID and transmits the image data to the second image processing apparatus.

6. A method performed by a first image processing apparatus for executing a job in cooperation with a second image processing apparatus being connectable to the first image processing apparatus via a network, the method comprising steps of:
  scanning an image on an original and generating image data;
  acquiring, from the second image processing apparatus, function information of the second image processing apparatus;
  determining whether or not the second image processing apparatus has a color print capability based on the function information acquired in the acquiring step;
  in a case where the determination unit has determined that the second image processing apparatus has the color print capability, and the first image processing apparatus has the color scan capability, controlling a scan setting screen of a display device according to a job to be performed, such that settings of both the color scan function and monochrome scan function are selectable on the scan setting screen by a user, in a case where the determination unit has determined that the second image processing apparatus does not have the color print capability, and the first image processing apparatus has the color scan capability, controls display of the scan setting screen, such that settings of the color scan function are not selectable and settings of the monochrome scan function are selectable on the scan setting screen by a user;

deciding a scan setting for the job in accordance with information inputted via the scan setting screen; and transmitting the image data generated by scanning the image in accordance with the scan setting decided in the deciding step from the first image processing apparatus to the second image processing apparatus.

7. A non-transient computer-readable storage medium storing program code that, when executed, causes a computer of a first image processing apparatus to perform a method in which the first image processing apparatus executes a job in cooperation with a second image processing apparatus being connectable to the first image processing apparatus via a network, wherein the method includes steps of:

scanning an image on an original and generating image data;

acquiring, from the second image processing apparatus, function information of the second image processing apparatus;

determining whether or not the second image processing apparatus has a color print capability based on the function information acquired in the acquiring step;

in a case where the determination unit has determined that the second image processing apparatus has the color print capability, and the first image processing apparatus has the color scan capability, controlling a scan setting screen of a display device according to a job to be performed, such that settings of both the color scan function and monochrome scan function are selectable on the scan setting screen by a user, in a case where the determination unit has determined that the second image processing apparatus does not have the color print capability, and the first image processing apparatus has the color scan capability, controls display of the scan setting screen, such that settings of the color scan function are not selectable and settings of the monochrome scan function are selectable on the scan setting screen by a user;

deciding a scan setting for the job in accordance with information inputted via the scan setting screen; and transmitting the image data generated by scanning the image in accordance with the scan setting decided in the deciding step from the first image processing apparatus to the second image processing apparatus.

* * * * *